United States Patent [19]
Tsang et al.

[11] Patent Number: 5,888,921
[45] Date of Patent: Mar. 30, 1999

[54] BINARY MOLECULAR SIEVES HAVING A CORE AND SHELL OF DIFFERENT STRUCTURES AND COMPOSITIONS

[75] Inventors: Chih-Hao Mark Tsang, Houston; Pei-Shing Eugene Dai, Port Arthur; Randall Hughes Petty, Port Neches, all of Tex.

[73] Assignee: ABB Lummus Global Inc., Bloomfield, N.J.

[21] Appl. No.: 548,065

[22] Filed: Oct. 25, 1995

[51] Int. Cl.$^6$ ...................................................... B01J 29/06
[52] U.S. Cl. .............................. 502/64; 502/71; 502/208; 502/214
[58] Field of Search ................... 502/63, 64, 67, 502/69, 208, 214, 263, 71

[56] References Cited

U.S. PATENT DOCUMENTS

| | | | |
|---|---|---|---|
| 4,605,637 | 8/1986 | Chang et al. | 502/64 |
| 4,791,083 | 12/1988 | Pellet et al. | 502/64 |
| 4,803,184 | 2/1989 | Long et al. | 502/63 |
| 4,814,316 | 3/1989 | Pellet et al. | 502/214 |
| 4,867,861 | 9/1989 | Abdo et al. | 208/27 |
| 5,179,054 | 1/1993 | Schipper et al. | 502/67 |

*Primary Examiner*—Steven Bos
*Assistant Examiner*—Thomas G. Dunn, Jr.
*Attorney, Agent, or Firm*—Alix, Yale & Ristas, LLP

[57] ABSTRACT

Disclosed is a novel binary sieve catalyst useful for olefin upgrading and fluid catalytic cracking which comprises a crystalline zeolite metallosilicate core and a shell selected from an aluminum phosphate molecular sieve ($AlPO_4$), a silicon-substituted aluminophosphate (SAPO), a metal aluminophosphate (MeAPO), and a crystalline metal aluminophosphate (MeAPSO) and is generally synthesized by a method comprising:

adding a powdered form of crystalline zeolite metallosilicate into an aqueous slurry comprising phosphoric acid, alumina source, metal salt and an amine, mixing the slurry for 1 to 12 hours in a Teflon liner at room temperature, sealing said slurry in an autoclave and placing said slurry in an oven at 130° C. to 240° C. for 12–168 hours to form said binary molecular sieve catalyst, washing and drying the product, calcining the product at 530° to 570° C. in nitrogen for 5–15 hours, calcining the product in air for 1 to 3 hours to burn off the template.

24 Claims, 10 Drawing Sheets

Isobutylene Wt% Yield from Propylene Upgrading Reaction over Physical Mixtures of ZSM-5 and ALPO-5

Isobutylene Wt% Yield from FCC-MAT Test
Using Physical Mixtures of ZSM-5 and ALPO-5 as FCC Additives
(Normalized to Wt% Yield Obtained from Base Catalyst Only Case)

FCC-MAT: 4 g cat, c/o=5, 960 F, WHSV=32 h-1, additive=2 Wt%

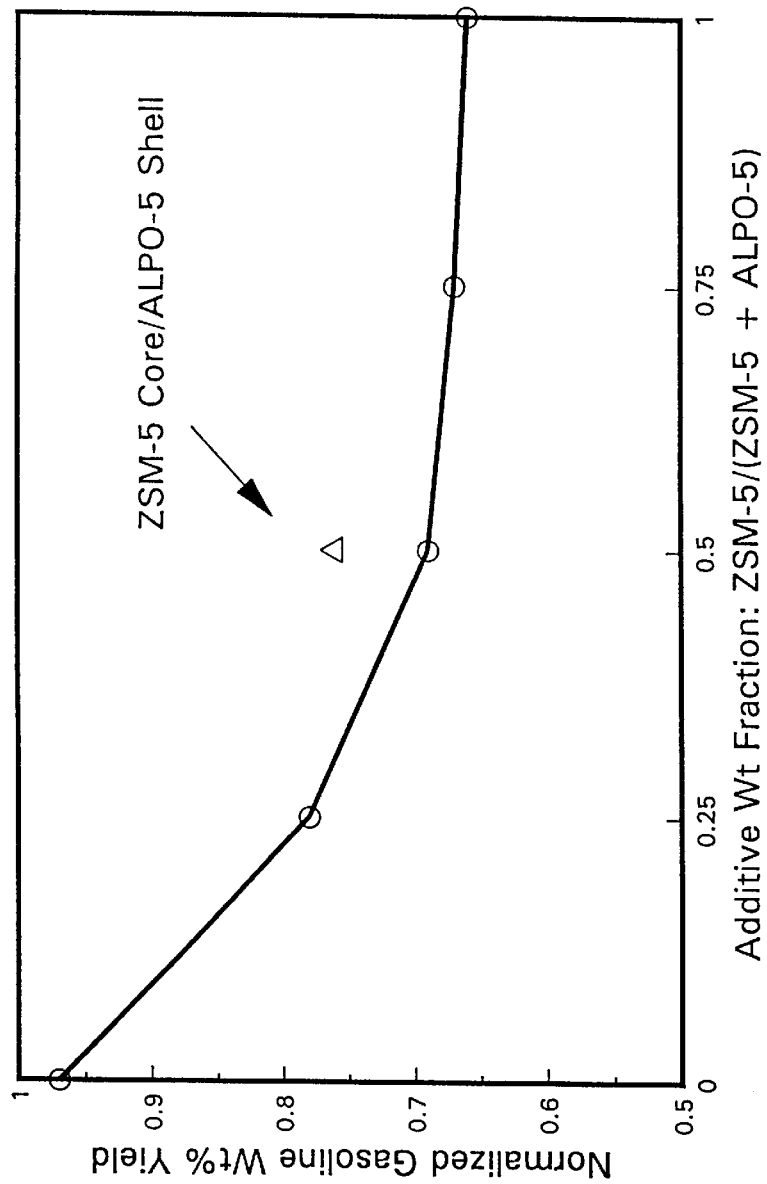

BINARY MOLECULAR SIEVES HAVING A CORE AND SHELL OF DIFFERENT STRUCTURES AND COMPOSITIONS

FIELD OF THE INVENTION

This invention relates to the synthesis of molecular sieves comprising layers of different compositions, acidity and structures. More particularly, this invention relates to the synthesis of a shell comprising an aluminum phosphate molecular sieve, a silicon-substituted aluminophosphate molecular sieve, or a crystalline metal aluminum phosphate around a crystalline zeolite core. In a particular example, this invention relates to the synthesis of ALPO-5 around ZSM-5 and to the use of the new composition in processes such as propylene upgrading and catalytic cracking.

BACKGROUND OF THE INVENTION

Molecular Sieves

Natural and synthetic zeolitic crystalline aluminosilicates are useful as catalysts and adsorbents. These aluminosilicates have distinct crystal structures which are demonstrated by X-ray diffraction. The crystal structure defines cavities and pores which are characteristic of the different species. The adsorptive catalytic properties of each crystalline aluminosilicate are determined in part by the dimensions of its pores and cavities. Thus, the utility of a particular zeolite in a particular application depends at least partly on its crystal structure.

Molecular sieves such as ZSM-5 and Y-zeolites are materials of great importance in catalytic processes. Active acid sites and shape selectivity often grant molecular sieves interesting characteristics in catalyzing chemical reactions.

Crystalline aluminosilicates are usually prepared from aqueous reaction mixtures containing alkali or alkaline earth metal oxides, silica, and alumina. "Nitrogenous zeolites" have been prepared from reaction mixtures containing an organic templating agent, usually a nitrogen-containing organic cation. By varying the synthesis conditions and the composition of the reaction mixture, different zeolites can be formed using the same templating agent.

In recent years many new breeds of molecular sieves with various pore sizes and acidity have been synthesized. Synergistic effects may be obtained by forming new materials consisting of two kinds of molecular sieves, one as a core encapsulated by another as the shell. The catalytic performance of the core will be affected by the nature of the shell in terms of shape selectivity and acidity, especially in diffusion controlled reactions.

The intergrowth phenomenon of the zeolite crystals is also known. It corresponds to a heterogeneous crystallization in which the crystals of a zeolite B appear sporadically during the crystallization of a zeolite A. Microscopic examination does not generally detect the zeolite intergrowths. These are evidenced by microdiffraction studies in which zones of the zeolite B appear as defects in the structure of the zeolite A. The best known example of intergrowth is that of the zeolite T which issues from the intergrowth of offretite and erionite. Since the intergrowth leads to a perturbation in the form and/or the size of the cages and channels, the zeolite AB obtained will have different properties from the two zeolites of which it is formed.

In general, zeolites may be divided into ten different structural types depending on the structural building blocks. These groups include the analcime group, natorlite group, chabazite group, phillipsite group, heulandite group, mordenite group, faujasite group, laumontite group, pentasil group and the clathrate group. For an overview of zeolite science and the preparation of zeolite molecular sieves, one may wish to refer to Denkewicz R. P. (1987), "Zeolite Science: An Overview", from *Jrnl. Mater. Ed.*, (5) and Breck, D. W. (1984), *Zeolite Molecular Sieves*, R. E. Krieger Publishing Co., Malabar, Fla., both incorporated herein by reference.

Molecular sieves of the crystalline zeolite type as well as the aluminum phosphate, crystalline silicoaluminophosphate or crystalline metal aluminophosphate type are known in the art and now comprise hundreds of species of both naturally occurring and synthetic compositions. In general, the crystalline zeolites are aluminosilicate frameworks based on an infinitely extending three-dimensional network of $SiO_4$ and $[AlO_4]^{-1}$ tetrahedra linked through common oxygen atoms. The framework structure encloses cavities occupied by large ions and water molecules, both of which have considerable freedom of movement, permitting ion exchange and reversible dehydration.

The aluminum phosphate molecular sieves are generally structures comprised of $[AlO_4]^{-1}$ and $[PO_4]^{+1}$ tetrahedra linked through common oxygen atoms. Molecular sieves are attractive as interactive support materials because of their structural features and physical properties. These materials can provide shape selectivity, ion exchange, acid-base sites, and large electrostatic fields.

Early crystalline aluminophosphates and a method for their preparation are disclosed in U.S. Pat. No. 4,310,440, incorporated herein by reference in its entirety. The class of aluminophosphate described therein have an essential crystalline framework structure, the chemical composition of which is expressed in terms of molar ratios of oxides as:

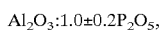

$$Al_2O_3 : 1.0 \pm 0.2 P_2O_5,$$

said framework structure being microporous where the pores are uniform and in each species have nominal diameters within the range of from 3 to 10 Angstroms, an intracrystalline adsorption capacity for water at 4.6 torr and 24° C. of at least 3.5 weight percent, the adsorption of water being completely reversible while retaining the same essential framework topology in both the hydrated and dehydrated state. The term "essential framework topology" refers to the spatial arrangement of the primary Al—O and P—O bond linkages. No change in the framework topology indicates that there is no disruption of these primary bond linkages. The aluminophosphates are prepared by hydrothermal crystallization of a reaction mixture prepared by combining a reactive source of phosphate, alumina and water and at least one templating agent.

For an overview of structures and template concepts of aluminophosphates see P. J. Grobet et al. (Editors) *Innovations in Zeolite Materials in Science*, Elsevier Science Publishers, B. V., Amsterdam. This article describes several different types of aluminophosphates.

Aluminophosphates are different from microporous compositions synthesized with silica. The aluminophosphate molecular sieves are moderately hydrophilic, apparently due to the difference in electronegativity between aluminum and phosphorus. Their intracrystalline pore volumes and pore diameters are comparable to those known for zeolites and silica molecular sieves.

One class of aluminophosphates are substituted with silicon. They are described in U.S. Pat. No. 4,440,871, incorporated herein by reference in its entirety. The materials have a three dimensional crystal framework of $PO_2^+$, $AlO_2^-$ and $SiO_2$ tetrahedral units, and exclusive of any alkali metal or calcium which may optionally be present, an as-synthesized empirical chemical composition on an anhydrous basis of:

$$mR(Si_xAl_yP_z)O_2$$

wherein "R" represents at least one organic templating agent present in the intracrystalline pore system: "m" represents the moles of "R" present per mole of $(Si_xAl_yP_z)$ and "x", "y", and "z" represent the mole fractions of silicon, aluminum and phosphorus, respectively as tetrahedral oxides. Examples include SAPO-5, SAPO-11, SAPO-16, SAPO-17, SAPO-20, SAPO-31, SAPO-34, SAPO-35, SAPO-37, SAPO-40, SAPO-42 and SAPO-49.

Other crystalline microporous compositions include crystalline metal aluminophosphates. They are described in U.S. Pat. No. 4,567,029, incorporated herein by reference in its entirety. The members of this novel class of crystalline metal aluminophosphates have a three-dimensional microporous framework structure of $MO_2$, $AlO_2$ and $PO_2$ tetrahedral units and have an empirical chemical composition on an anhydrous basis expressed by the formula:

$$mR: (M_xAl_yP_z)O_2$$

wherein "R" represents at least one organic templating agent present in the intracrystalline pore system; "m" represents the moles of "R" present per mole of $(M_xAl_yP_z)O_2$ and has a value of from zero to 0.3; "M" represents at least one metal of the group magnesium, manganese, zinc and cobalt; and "x", "y" and "z" represents the mole fractions of "M", aluminum and phosphorus, respectively, present as tetrahedral oxides.

Highly crystalline cobalt aluminophosphates of type 36 have been synthesized and characterized. See "Investigations on the CoAPO-36 Molecular Sieve", Akolekar, D. B., Catalysis Letters 28 (1994) 249–262.

In an article titled "Synthesis, Characterization, Thermal Stability, Acidity and Catalytic Properties of Large-Pore MAPO-46", J. Chem. Soc. FARADAY TRAN., 1993, 89(22) 4141–4147, Akolekar, et al. the catalytic activity of MAPO-46 in ethanol to aromatics conversion is discussed.

Another class of crystalline molecular sieves have a three dimensional microporous framework structure of $MgO_2^{-2}$, $AlO_2$, $PO_2^+$ and $SiO_2$ tetrahedral oxide units. They are described in U.S. Pat. No. 4,882,038, incorporated by reference in its entirety. These molecular sieves exhibit ion-exchange, adsorption and catalytic properties. The members of the class have an empirical chemical composition on an anhydrous basis expressed by the formula:

$$mR: (Mg_wAl_xP_ySi_z)O_2$$

wherein R represents at least one organic templating agent present in the intracrystalline pore system; "m" represents the molar amount of "R" present per mole of $(Mg_wAl_xP_ySi_z)O_2$ and has a value from zero to about 0.3; and "w", "x", "y" and "z" represent the mole fractions of magnesium, aluminum, phosphorus and silicon, respectively, present as tetrahedral oxides.

The Mg APSO compositions are generally synthesized by hydrothermal crystallization for an effective time at effective pressures and temperatures from a reaction mixture containing reactive sources of magnesium, silicon, aluminum and phosphorus and an organic templating agent, as described in U.S. Pat. No. 4,882,038.

In an article titled "Comparison of Thermal Stability, Acidity, Catalytic Properties and Deactivation Behavior of Novel Aluminophosphate-based Molecular Sieves of Type 36", J. CHEM SOC. FARADAY TRANS. 1994, 90 (7), 1041–1046, D. B. Akolekar discusses studies in which different MeAPOS, containing Mn, Zn, Co, and Mg were prepared and characterized.

In U.S. Pat. No. 5,167,942 there is disclosed a process for preparation of faujasite-type zeolites or aluminum phosphate molecular sieves which include an encapsulated multidentate metal chelate complex which comprises preparing an aqueous alkaline admixture of aluminate and silicate anions and an alkaline or alkaline earth hydroxide, in a molar ratio and a pH appropriate for the formation of a zeolite of the faujasite group, introducing a multidentate metal chelate complex larger than nominal pore size of the faujasite zeolite into the admixture, reacting the admixture under conditions appropriate for the formation of a crystalline zeolite of the faujasite group and preparing from the reacted admixture a crystalline zeolite having a multidentate metal complex encapsulated within the zeolite.

In U.S. Pat. No. 4,847,224 there is disclosed a binary zeolite system comprising two zeolites, A and B, having different crystalline structures while having common structural units, where the crystals of zeolite A, forming a central core, are selected from the group consisting of offretite and omega zeolites; and the crystals of zeolite B, forming the crown, are selected from omega zeolite and mordenite. Zeolites A and B being disposed concentrically and following the same longitudinal axis are both limited to aluminosilicate compositions.

A surface-inactive shape selective metallosilicate catalyst, useful for the conversion of lower molecular weight olefins is disclosed in U.S. Pat. No. 4,868,146. The novel composition comprises an inner core portion and an outer portion disposed as a porous shell around the inner portion, wherein the inner portion consists essentially of metallosilicate zeolite having a medium pore structure, such as ZSM-5 or ZSM-23 and the outer portion comprising a fluoride containing crystalline shell consisting essentially of silica substantially free of acidic sites and having substantially the same crystalline structure as the inner core portion. This system is limited to a core and shell of the same crystal structure and XRD pattern.

U.S. Pat. No. 4,936,977 discloses a crystalline zeolite SSZ-24 which is prepared using an adamantine quaternary ion as a template and is used to convert hydrocarbons.

In U.S. Pat. No. 4,946,580 there is disclosed a method for the catalytic cracking of hydrocarbon feed to convert it essentially into gasoline and hydrogen which comprises contacting said hydrocarbon feed with a catalytically effective amount of cracking catalyst wherein the catalyst is the binary zeolite system described in U.S. Pat. No. 4,847,224, supra.

U.S. Pat. No. 5,179,054 discloses a layered catalytic cracking catalyst comprising a core and a shell, each having openings of a specified range. The shell which may further contain a metal passivator can act as a metal sink and can remove metals from the unit by attrition. The catalyst is preferably prepared by forming the core and then coating or encapsulating the core with a shell material. In this system, the core and shell configurations result from incorporating matrix and binder components with zeolite, not by directly synthesizing one zeolite around another.

In U.S. Pat. No. 5,238,676 there is disclosed a method for modifying a composition of matter comprising an inorganic, porous, non-layered crystalline phase material exhibiting, after calcination an X-ray diffraction pattern with at least one peak at a d-spacing greater than 18 Å and having a benzene adsorption capacity of greater than 15 gms benzene per 100 gm of said material at 6.7 kPa (50 ton) and 25° C., comprising contacting with a treatment composition comprising an inorganic oxide of a trivalent element X or a precursor of said inorganic oxide, said contacting occurring under conditions sufficient to incorporate trivalent element X in said crystalline phase material.

European Patent Application 113,473 claims the formation of a zeolite having a double structure which comprises a core made of crystalline borosilicate and a shell made of crystalline silicon oxide. The system is limited to a core and shell of the same crystal structure, i.e. showing the same X-ray diffraction pattern. There is no evidence presented on the actual forming of the core and shell configuration.

None of these references discloses a binary molecular sieve having a zeolite core and an aluminum phosphate molecular sieve shell.

FCC

Fluidized Catalytic Cracking (FCC) is well known in the refining industry as particularly advantageous for conversion of heavy petroleum fractions to lighter product.

The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and conducted to a regenerator, where coke is burned off the catalyst, with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain the desired reactor temperature.

The design of many modern FCC units provides for the addition of the hot regenerated catalyst at the base of a riser reactor. Fluidization of the solid catalyst particles is promoted with a lift gas. Steam is used to promote the mixing and atomization of the feedstock.

Hot catalyst (650° C.$^+$) from the regenerator is mixed with preheated (150°–375° C.) charge stock. The catalyst vaporizes and superheats the feed to the desired cracking temperature usually 450°–600° C.

Coke deposits on the catalyst and the feed is cracked during the upward passage of the catalyst and feed.

The coked catalyst and the cracked products exit the riser and enter a solid-gas separation system, e.g., a series of cyclones, at the top of the reactor vessel. The cracked products pass to product separation. Typically, the cracked hydrocarbon products are fractionated into a series of products, including gas, gasoline, light gas oil, and heavy cycle gas oil. Some heavy cycle gas oil may be recycled to the reactor. The bottoms product, a "slurry oil" is conventionally allowed to settle. The catalyst rich solids portion of the settled product may be recycled to the reactor. The clarified slurry oil is a heavy product.

Good overviews of FCC process can be found in: U.S. Pat. Nos. 3,152,065 (Sharp et al.); 3,261,776 (Banman et al.); 3,654,140 (Griffel et al.); 3,812,029 (Snyder); 4,093, 537, 4,118,337, 4,118,338, 4,218,306 (Gross et al.); 4,444, 722 (Owen); 4,459,203 (Beech et al.); 4,639,308 (Lee); 4,675,099, 4,681,743 (Skraba) as well as in Venuto et al., Fluid Catalytic Cracking With Zeolite Catalysts, Marcel Dekker, Inc. (1979) incorporated by reference herein in their entirety.

FCC catalyst can contain finely divided acidic zeolites comprising, e.g., faujasites such as Rare Earth Y (REY), Dealuminized Y (DAY), Ultrastable Y (USY), Rare Earth Containing Ultrastable Y (RE-USY), Si-Enriched Dealuminized Zeolite Y (LZ-210) disclosed in U.S. Pat. Nos. 4,711, 864, 4,711,770 and 4,503,023, all of which are incorporated herein by reference) and Ultrahydrophobic Y (UHP-Y).

FCC catalysts are typically fine particles having particle diameters ranging from 20 to 150 microns and having an average diameter around 60–80 microns.

Though many improvements have been made in the FCC process, a number of problem areas remain. In addition, some process variables change depending upon the desired products. None of the available references suggests using a binary sieve containing a zeolite core and an ALPO shell in catalytic cracking.

Propylene Upgrading

As is well-known to those skilled in the art, the advent of reformulated gasolines to meet ever increasing environmental and other requirements is reflected in a significant increase in the demand for isobutylene and isoamylenes which are used to prepare methyl t-butyl ether (MTBE) and methyl t-amyl ether (TAME)—the gasoline additives of significant current interest. Isobutane and n-butenes are also of increasing importance due to the high octane alkylates that can be produced from them.

On the other hand, there are abundant supplies of propylene which are available from refining processes such as catalytic cracking. It would be desirable to be able to convert these propylene ($C_3^=$) streams to isobutane (i-$C_4$), n-butenes (n-$C_4^=$), isobutylene (i-$C_4^=$) and isoamylenes (i-$C_5^=$) streams.

U.S. Pat. No. 4,465,884 teaches a process of converting $C_{3+}$ olefins to product comprising non-aromatic hydrocarbons of higher molecular weight than feedstock olefins and aromatic hydrocarbons using large pore Y and beta zeolites. Butenes, isoamylenes and isobutane were not the products of interest.

U.S. Pat. Nos. 4,957,709 and 4,886,925 teach a system combining olefin interconversion (upgrading olefins into streams rich in isobutylene and isoamylene with the production of MTBE and TAME).

U.S. Pat. No. 5,146,029 teaches olefin interconversion by MCM-22 zeolite. The application is limited solely to the MCM-22.

U.S. Pat. Nos. 5,134,241 and 5,134,242 teach olefin upgrading using the MCM-41 zeolite.

U.S. Pat. No. 4,899,014 discloses olefins upgrading using ZSM-5, however the upgrading is mainly for gasoline production.

U.S. Pat. No. 4,556,753 teaches upgrading propylene to isobutene using silicalite zeolites in the presence of steam, however isoamylenes were not included.

U.S. Pat. No. 4,527,001 discloses small olefin interconversions using metal phosphate molecular sieves, such as, for example, $AlPO_4$, SAPO, FeAPO and CoAPO.

Instant Invention

It would be a distinct advance in the art if it were possible to synthesize a molecular sieve with different layers of compositions, acidity and structures and take advantage of the reactant, product, and transition-state shape selectivities.

No references have been found in the art which disclose a catalyst composition comprising a binary sieve wherein the core is a crystalline zeolite and the shell is an aluminum phosphate molecular sieve (ALPO), a silicon-substituted aluminophosphate molecular sieve (SAPO), or a crystalline metal aluminophosphate (MeAPO). Furthermore, there is nothing in the art which teaches or suggests using such catalyst composition for catalytic cracking and propylene upgrading.

SUMMARY OF THE INVENTION

In accordance with the foregoing the present invention is a process for preparing a unique catalyst containing a core of zeolitic crystalline aluminosilicate and a shell selected from an aluminum phosphate molecular sieve, a silicon-substituted aluminophosphate molecular sieve, or a crystalline metal aluminophosphate, and to the composition resulting therefrom.

In one example a shell of ALPO-5 is grown on a metallosilicate core containing Bronsted and Lewis acid sites, preferably ZSM-5. The preferred crystalline metallosilicate inner portion has a silica:metal oxide molar ratio of about 10:1 to about 300:1, and a aluminum phosphate outer shell molar ratio of close to one.

The preferred embodiment of the process comprises adding a powdered form of ZSM-5 into an aqueous slurry comprising phosphoric acid pseudoboehmite alumina and tripropylamine, wherein the slurry has a molar ratio of $Al_2O_3:P_2O_5$: tripropylamine: water of about 1:1:1:40, mixing the slurry for 1 to 12 hours in a teflon liner at room temperature, sealing said slurry in an autoclave and placing said slurry in an oven at 130° to 170° C. for 12–96 hours to form said binary sieve product, washing and drying the product, calcining the product at 530° to 570° C. in nitrogen for 5–15 hours, and calcining the product in air for 1 to 3 hours to burn off the template.

The novel catalysts were characterized by X-ray diffraction, X-ray photoelectron spectroscopy and nuclear magnetic resonance and the results compared with known samples.

BRIEF DESCRIPTION OF THE DRAWINGS

FIG. 10 shows gasoline yield from an FCC-MAT test using physical mixtures of ZSM-5 and ALPO-5 as FCC additives.

DETAILED DESCRIPTION OF THE INVENTION

Figure 1:
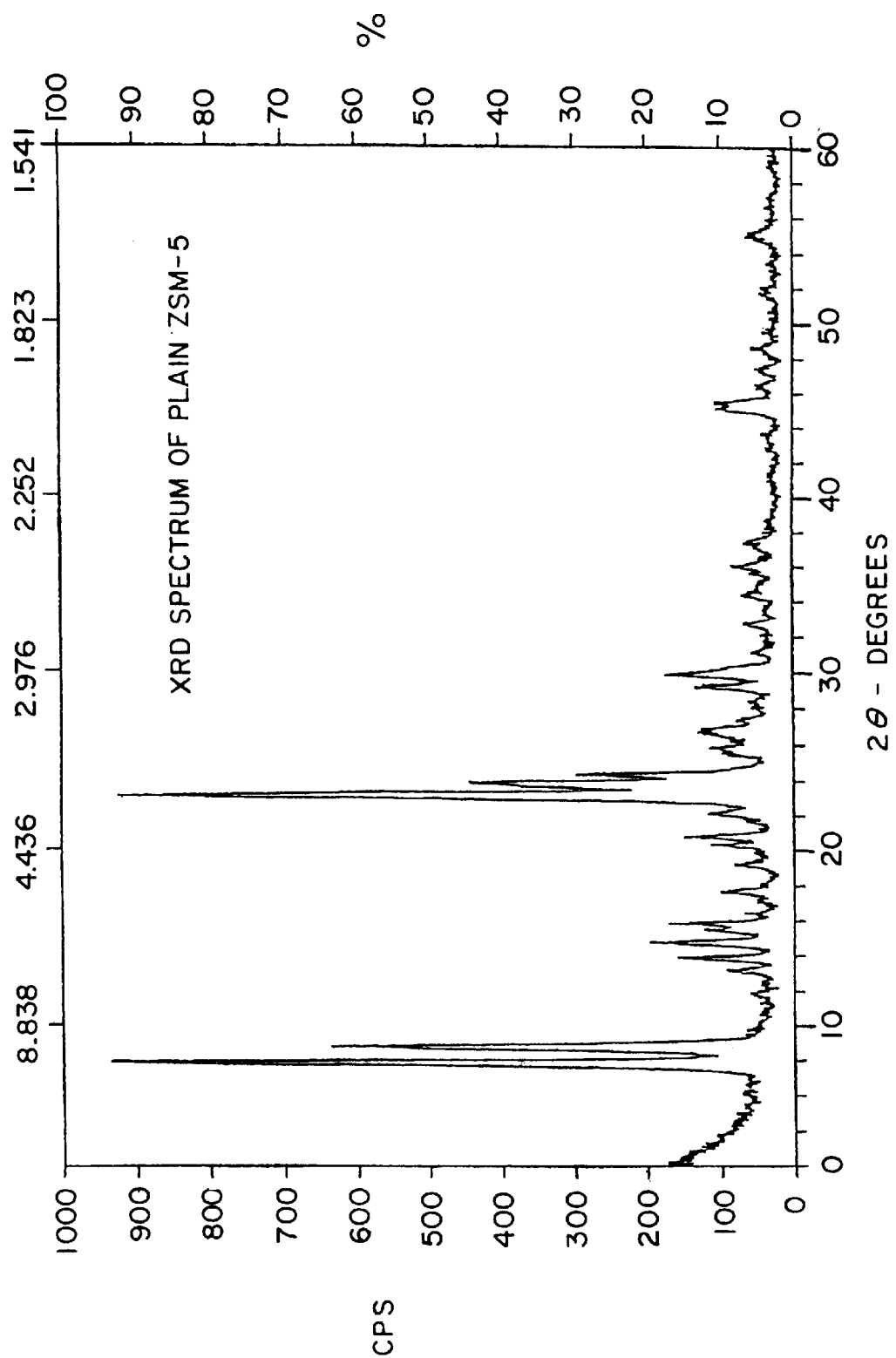
FIG. 1 shows the X-ray diffraction spectrum of plain ZSM-5.

The novel binary molecular sieve catalyst prepared according to the process of the instant invention comprises an inner portion and an outer portion disposed as a porous shell around the inner portion, wherein the inner portion comprises a medium pore metallosilicate and the outer portion comprises an aluminum phosphate molecular sieve, a silicon-substituted aluminophosphate, or a crystalline metal aluminophosphate.

The portion which defines the interior of the catalyst is a crystalline metallosilicate material. This inner portion is a medium pore crystalline metallosilicate with a silica:metal oxide molar ratio of about 10:1 to about 300:1. The pore size of the core material is in the intermediate range of about 5 to 7 Angstroms. The average crystal size of the metallosilicate core material is about 0.02 to about 5.0 microns.

The metallosilicate catalysts useful in the process of this invention include siliceous zeolites generally known as medium pore, shape-selective catalysts. Recent developments in zeolite technology have provided a group of medium pore siliceous materials having similar pore geometry. Most prominent among these intermediate pore size zeolites is ZSM-5, which is usually synthesized with active acid sites by incorporating a tetrahedrally coordinated metal, such as Al, Ga, B or Fe, within the zeolitic framework. While suitable zeolites having a coordinated metal oxide to silica molar ratio of 20:1 to 200:1 or higher may be used, it is advantageous to employ a standard aluminosilicate, ZSM-5 having a silica:alumina molar ratio of about 25:1 to 70:1.

The crystalline structure of ZSM-5 is readily recognized by its X-ray diffraction pattern which is described in U.S. Pat. No. 3,702,866, (Argauer et al.) incorporated herein by reference in its entirety.

The class of highly siliceous zeolites defined herein is also represented by ZSM-11, ZSM-12, ZSM-22, ZSM-23, ZSM-35, ZSM-48, and other similar materials. ZSM-5 is also described in U.S. Pat. No. 4,702,886 (Argauer et al); ZSM-11 in U.S. Pat. No. 3,709,979 (Chu); ZSM-12 in U.S. Pat. No. 3,832,449 (Rosinski et al.); ZSM-22 in U.S. Pat. No. 4,046,859 (Plank et al.); ZSM-23 in U.S. Pat. No. 4,076842 (Plank et al.); ZSM-35 in U.S. Pat. No. 4,016,245 (Plank et al.); and ZSM-48 in U.S. Pat. No. 4,397,827 (Chu); incorporated herein by reference.

The portion of the binary molecular sieve which comprises the shell is an aluminophosphate-based molecular sieve. The molar ratio of $Al_2O_3-P_2O_5$ in the outer shell is close to one. Aluminophosphate-based molecular sieves represent a new generation of crystalline microporous oxides with one or more of an additional thirteen elements incorporated into the $AlPO_4$ framework. They have uniform dimensions ranging from about 3Å to about 10Å and capable of making size selective separations of molecular species. More than two dozen structure types have been reported, including zeolite topological analogues and a large number of novel structures. Many of the structures have been determined by X-ray and neutron diffraction techniques. A good review of the background and synthesis of aluminophosphate is found in U.S. Pat. No. 4,310,440 to Wilson et al. (Jan. 1982) for the synthesis of said compositions. U.S. Pat. No. 4,310,440 is incorporated herein by reference in its entirety.

The preferred aluminum source in forming the shell is either an aluminum alkoxide, such as aluminum isoproproxide, or pseudoboehmite. The crystalline or amorphous aluminophosphates which are a suitable source of phosphorus are, of course, also suitable sources of aluminum. Other sources of aluminum used in zeolite synthesis, such as gibbsite, sodium aluminate and aluminum trichloride, can be employed but are not preferred.

The most suitable phosphorus source yet found for the present process is phosphoric acid, but organic phosphates such as triethylphosphate have been found satisfactory, and so also have crystalline or amorphous aluminophosphates such as the $AlPO_4$ composition of U.S. Pat. No. 4,310,440. Organophosphorus compounds, such as tetrabutylphosphonium bromide do not, apparently serve as reactive sources of phosphorus, but these compounds can function as templating agents. Conventional phosphorus salts such as sodium metaphosphate, may be used, at least in part, as the phosphorus source, but are not preferred.

In addition to ALPOs, silicon-substituted aluminophosphates (SAPO) are useful in the synthesis of the binary molecular sieves. They are described in U.S. Pat. No. 4,440,871, incorporated by reference in its entirety. SAPOs have a three-dimensional microporous crystal framework structure of $PO_2^+$, $AlO_2^-$ and $SiO_2$ tetrahedral units, and an empirical chemical composition on an anhydrous basis represented by:

mR: $(Si_xAl_yP_z)O_2$ wherein "R" represents at least one organic templating agent present in the intracrystalline pore system: "m" represents the moles of "R" present per mole of $(Si_xAl_yP_z)O_2$ and has a value of from zero to 0.3, the maximum value in each case depending upon the molecular dimensions of the templating agent and the available void volume of the pore system.

The shell of the binary molecular sieve may also comprise framework substituted crystalline microporous aluminophosphates in which the substituent metal is one of a mixture of two or more divalent metals of the group magnesium, manganese, zinc and cobalt, and which exhibit adsorption, ion-exchange and/or catalytic properties similar to aluminosilicate, aluminophosphate and silica aluminophospate molecular sieve compositions. Members of this class and their preparation are described in U.S. Pat. No. 4,567,029, incorporated herein by reference in its entirety. They have a three-dimensional microporous crystal framework structure of $MO_2$, $AlO_2$ and $PO_2$ tetrahedral units and have an essential empirical chemical composition, on an anhydrous basis, of:

mR: $(M_xAl_yP_z)O_2$ wherein "R" represents at least one organic templating agent present in the intracrystalline pore system; "m" represents the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved, "x", "y", and "z" represent the mole fractions of the metal "M", (i.e. magnesium, manganese, zinc and cobalt), aluminum and phosphorus, respectively, present as tetrahedral oxides.

These compositions are sometimes referred to by the acronym MeAPO. Also in those cases where the metal "Me" in the composition is magnesium, the acronym MAPO is applied to the composition. Similarly ZAPO, MnAPO and CoAPO are applied to the compositions which contain zinc, manganese and cobalt respectively. To identify the various structural species which make up each of the subgeneric classes MAPO, ZAPO, CoAPO and MnAPO, each species is assigned a number and is identified, for example, as ZAPO-5, MAPO-11, CoAPO-34 and so forth.

In forming the slurry which forms the outer shell the organic templating agent can be any of those heretofore proposed for use in the synthesis of conventional zeolite, aluminosilicates and microporous aluminophosphates. In general these compounds contain elements of Group VA of the Periodic Table of Elements, particularly nitrogen, phosphorus, arsenic and antimony, preferably N or P and most preferably N, which compounds also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and tri-amines are advantageously utilized, either alone or in combination with a quaternary ammonium compound or other templating compound. Mixtures of two or more templating agents can either produce mixtures of the desired metal aluminophosphates or the more strongly directing templating species may control the course of the reaction with the other templating species serving primarily to establish the pH conditions of the reaction gel. Representative templating agents wherein each R is an alkyl or aryl group containing from 1 to 8 carbon atoms are useful. Polymeric quaternary ammonium salts such as $[(C_{13}H_{32}N_2)(OH)_2]_x$ wherein "x" has a value of at least 2 are also suitably employed. Both mono-, di- and tri-amines are advantageously utilized, either alone or in combination with a quaternary ammonium compound or other templating compound. Mixtures of two or more templating agents can either produce mixtures of the desired metal aluminophosphates or the more strongly directing templating species may control the course of the reaction with the other templating species serving primarily to establish the pH conditions of the reaction gel. Representative templating agents include tetramethylammonium, tetraethylammonium, tetrapropylammonium or tetrabutlyammonium ions; di-n-propylamine, tripropylamine, triethylamine; or triethanolamine; piperidine; cyclohexylamine; 2-methylpyridine; N,N-dimethylbenzylamine; N-methylethanolamine; N-methylpiperidine; 3-methylpiperidine; N,N-dimethylethanolamine; choline; N,N'-dimethylpiperazine; 1,4-diazabicyclo(2,2,2) octane; N-methyldiethanolamine, N-methylethanolamine; N-methylpiperadine; 3-methylpiperadine, N-methylcyclohexylamine; 3-methylpyridine; 4-methylpyridine; quinculidine; N,N'-dimethyl-1,4-diazabicyclo(2,2,2) octane ion, di-n-butylamine; neopentylamine; di-n-pentylamine; isopropylamine; t-butylamine; ethylenediamine; pyrolidine; and 2-imidazolidone.

Where the shell is a metal-substituted aluminophosphate, the metals zinc, cobalt, magnesium and manganese can be introduced into the reaction system in any form which permits the formation in situ of reactive divalent ions of the respective metals. Advantageously salts, oxides or hydroxides of the metals are employed such as cobalt chloride hexahydrate, alpha cobaltous iodide, cobaltous sulfate, cobalt acetate, cobaltous bromide, cobaltous chloride, zinc acetate, zinc bromide, zinc formate, zinc iodide, zinc sulfate heptahydrate, magnesium acetate, magnesium bromide, magnesium chloride, magnesium iodide, magnesium nitrate, magnesium sulfate, manganous acetate, manganous bromide, manganous sulfate, and the like.

Synthesis Of ZSM-5/ALPO-5 Binary Sieve

The synthesis of ZSM-5 in ALPO-5 was carried out as follows: A powdered ZSM-5 sample obtained from Conteka was used as seeds to grow ALPO-5 around each of the ZSM-5 crystallites. The ZSM-5 seeds were added into an aqueous slurry containing phosphoric acid, pseudoboehmite alumina (Catapal B from Vista Chemical Co.), and tripropylamine template. The molar composition of the slurry was $Al_2O_3:P_2O_5$:tripropylamine: $H_2O$=about 1:1:1:40. The weight ratio of the oxides to form core and shell was 1:1.

The slurry was mixed in a Teflon liner at room temperature for 2 hours before being sealed in an autoclave and placed into a 150° C. oven for 24 hours. At the end of the synthesis, the autoclave was cooled overnight. After washing and drying, the product was calcined at 550° C. in nitrogen overnight and then in air for 2 hours in order to burn off the template.

Synthesis of molecular sieves having this design, namely a less acidic outer layer and a more acidic core, can be advantageous. For instance, a composite molecular sieve having a surface layer of ALPO-5 and a core of ZSM-5 is shown to be a promising additive in enhancing FCCU's isobutylene yield with minimal gasoline loss in Example 2. Gasoline-range products from cracking catalysts containing Y-zeolites can be subjected to isomerization with little further cracking taking place on the outer layer of ALPO-5 characterized by moderate acidity, however, smaller molecules with high diffusivity such as n-butenes can rapidly travel to the zeolite core and reach the sites of strong enough acidity for short chain isomerization.

Another example of a possible application for this molecular sieve design is in lube catalytic dewaxing. In that embodiment waxy components would be isomerized on the less acidic exterior, and unconverted n-paraffins would preferentially diffuse into and crack on the strong acid sites in the inner core. The product yield would be expected to be higher than the current technology using single composition ZSM-5.

Molecular sieves with multiple layers of different compositions can be synthesized by seeding the chosen core sieve into a liquor suitable for growing the outer sieve layer in the presence or absence of templates. The procedure may be repeated to form materials with more than two layers.

Synthesis of ZSM-5/SAPO Binary Sieve

The synthesis of ZSM-5 in a SAPO shell can be carried out by preparing a reaction mixture of 115.6 gms of 85 wt % orthophosphoric acid ($H_3PO_4$) and 59 gms water, adding 85.6 gms of a hydrated aluminum oxide, (a pseudo-boehmite phase, 70 wt % $Al_2PO_3$, 30 wt % $H_2O$) and stirring until homogeneous. To this mixture is added 19 gms of a fumed silica (Cabosil M-5) in 84 gms of water and stirred until homogeneous. Finally, 45.6 gms of di-n-propylamine ($Pr_2NH$) are added and stirred until homogeneous. The mixture had a pH of 8.7 and the following composition, expressing in molar ratios of oxides: $0.9Pr_2NH:0.6SiO_2: Al_2O_3: P_2O_5: 18H_2O$.

The powdered ZSM-5 is added to the above-described aqueous slurry. The weight ratio of the oxides to form core and shell is about 1:1.

The slurry is mixed in a Teflon liner at room temperature for 2 hours before being sealed in an autoclave and placed into a 200° C. oven for 5 days. At the end of the synthesis, the autoclave is cooled overnight. After washing and, drying, the product is calcined at about 550° C. in nitrogen overnight and then in air for 2 hours in order to burn off the template.

Synthesis of ZSM-5/MeAPO Binary Sieve

The synthesis of ZSM-5 in a MeAPO can be carried out by using MeAPOs in the shell which are substituted with, for example, magnesium and cobalt.

The process for forming a MgAPSO shell on a crystalline metallosilicate inner portion would comprise adding a powdered form of crystalline zeolite into an aqueous slurry resulting from adding a mixture of alumina powder with a silica compound in water, to the product resulting from the addition of magnesium oxide to a solution of phosphoric acid and water, blending the aforesaid mixture and adding tripropylamine ($Pr_3N$) wherein the molar ratio of $Pr_3N:MgO:Al_2O_3:P_2O_5:SiO_2:H_2O$ is 1–3:0.1–0.4:0.5–1.5: 0.5–1.5:0.1–0.3:45–55 stirring the mixture until homogeneous, transferring into a Teflon® coated autoclave, heating under static conditions @ 170° C.–230° C., for 80–120 hrs.; filtering the product, and washing the product, and drying the product overnight in an air oven at 80° C.–150° C.

The layers of the molecular sieves can be metallosilicates containing framework Si, Al, P, Ga, Fe, B, Ti, La, Y, Cr, Nb, V, Mg, Be, As, Zn, Ni, Mo, W, and etc., having sieved structures such as faujasite, Y, L, A, mordenite, beta, omega, offretite, ferrierite, chabazite, erionite, rho, MCM-22, ZSM-5, ZSM-11, ZSM-20, ZSM-23 or SAPO-36, SAPO-37, and SAPO-31.

The multi-layered molecular sieves by themselves or formed with matrix, binders, and fillers, can be used as the sole catalysts or additives/promoters for processes such as catalytic cracking, propylene upgrading, dewaxing, isomerization, oligomerization, reforming, hydroprocessing, and various chemical processes.

X-Ray Diffraction

Figure 2:
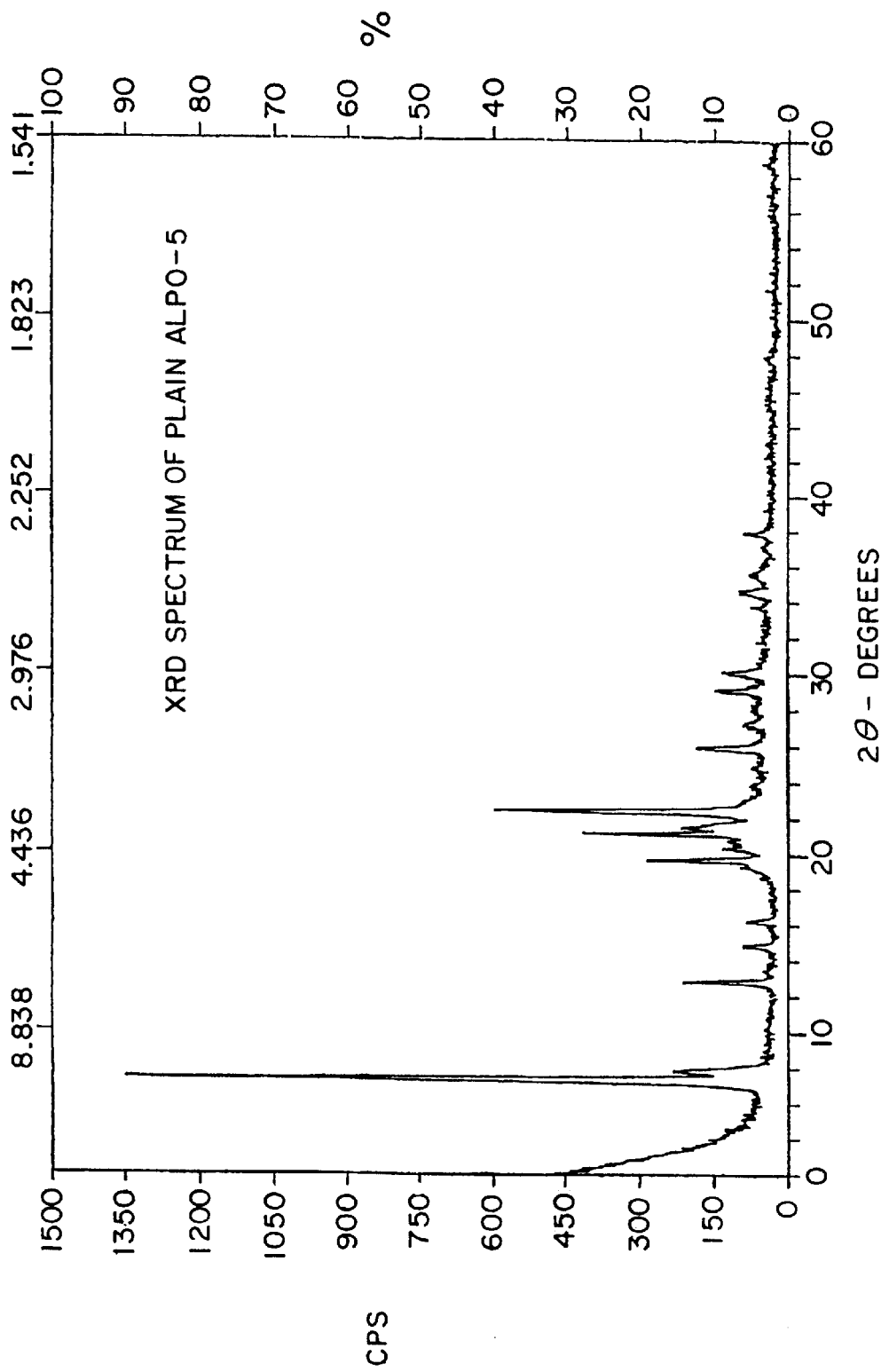
FIG. 2 shows the X-ray diffraction spectrum of plain ALPO-5.
Figure 3:
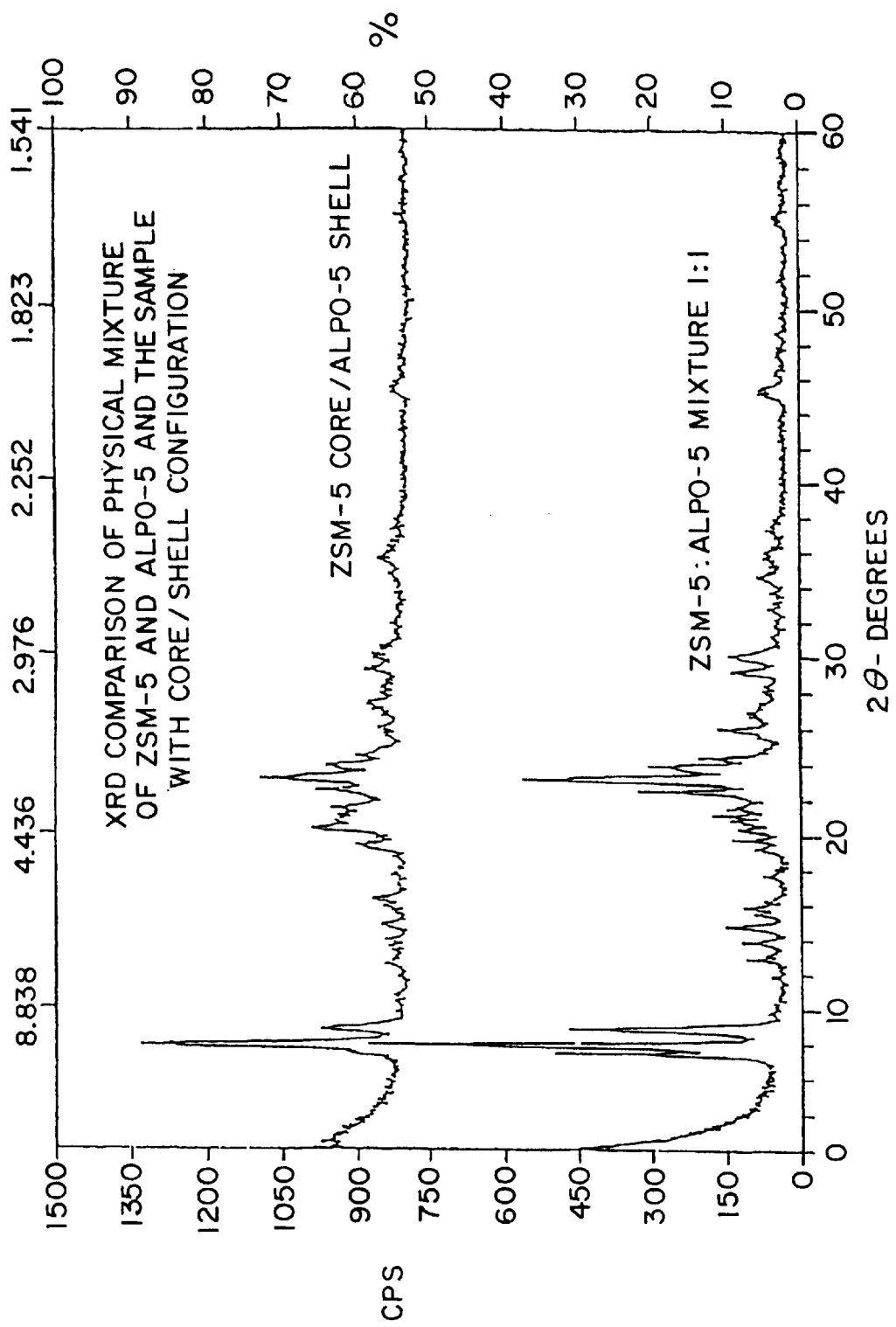
FIG. 3 shows an X-ray diffraction comparison of a physical mixture of ZSM-5 and ALPO-5 and the sample with core/shell configurations.
Figure 4:
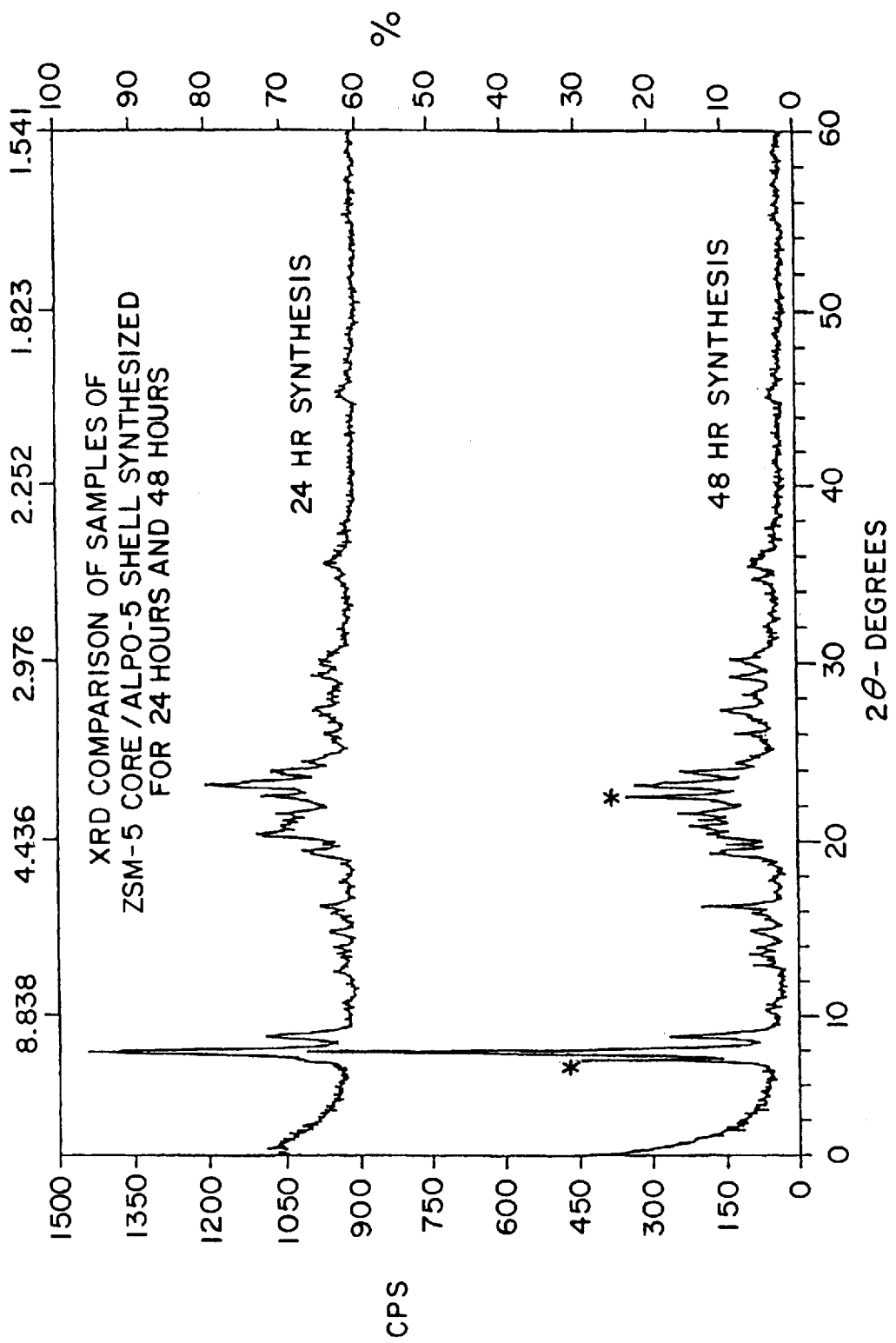
FIG. 4 shows an X-ray diffraction comparison of samples of ZSM-5 Core/ALPO-5 shell synthesized for 24 hours and 48 hours.

The ALPO-5 synthesized on the ZSM-5 seeds was characterized by X-ray diffraction (XRD) technique, which confirmed the desired structure was synthesized. The XRD spectra of neat ZSM-5 and ALPO-5 are reported in FIGS. 1 and 2, respectively. FIG. 3 compares the XRD spectra of the ZSM-5 core/ALPO-5 shell sample and a 1:1 physical mixture of ZSM-5 and ALPO-5. Both samples show peaks characteristic of ZSM-5 and ALPO-5. Differences in the relative peak intensity and crystallinity in these spectra indicate variations in the morphology of ALPO-5 when grown as an outer layer on ZSM-5. Moreover, FIG. 4 demonstrates that if the synthesis time to grow ALPO-5 around ZSM-5 is increased from 24 hours to 48 hours, higher intensity is observed on peaks that are characteristic of ALPO-5. The ZSM-5 core/ALPO-5 shell sample used in the following characterization and reaction studies was prepared by 24-hour synthesis.

X-Ray Photoelectron Spectroscopy Characterization and Chemical Analysis

In addition to the difference in morphology observed by XRD, examination using X-ray photoelectron spectroscopy (XPS) on these samples further proves the presence of ALPO-5 encapsulated ZSM-5. XPS is widely used as a technique to analyze the surface compositions of catalytic materials. When comparing XPS data with chemical analysis on the bulk composition, it is possible to reveal surface enrichment or deficiency in certain elements on catalyst samples.

Table 1 clearly shows that the surface of ZSM-5 core/ALPO-5 shell sample is deficient in Si compared with its bulk composition, indicating the burial of the aluminosilicate ZSM-5 under the silicon-free aluminophosphate ALPO-5 shell. On the other hand, the physical mixtures of separate ZSM-5 and ALPO-5 particles have closer agreement in the data of XPS and chemical analyses, even showing some enrichment in Si on the surface. In the light of this, the formation of ALPO-5 layer around the ZSM-5 seeds appears to be confirmed.

The Si signal detected by XPS in the ZSM-5 core/ALPO-5 shell sample does not necessarily mean the presence of naked ZSM-5 particles without ALPO-5 coating. SEM examinations show that the ZSM-5 crystallites used as seeds are of irregular forms. If the ALPO-5 layer on some edges of corners of the ZSM-5 seeds is thinner than the escape depth of the photoelectrons (about 50Å), XPS analysis will detect silicon. In fact, all the crystallinities observed in ZSM-5 or ALPO-5 or the binary molecular sieve samples are irregular. No definite forms of crystallites can be discerned.

Nuclear Magnetic Resonance Characterization

Figure 5:
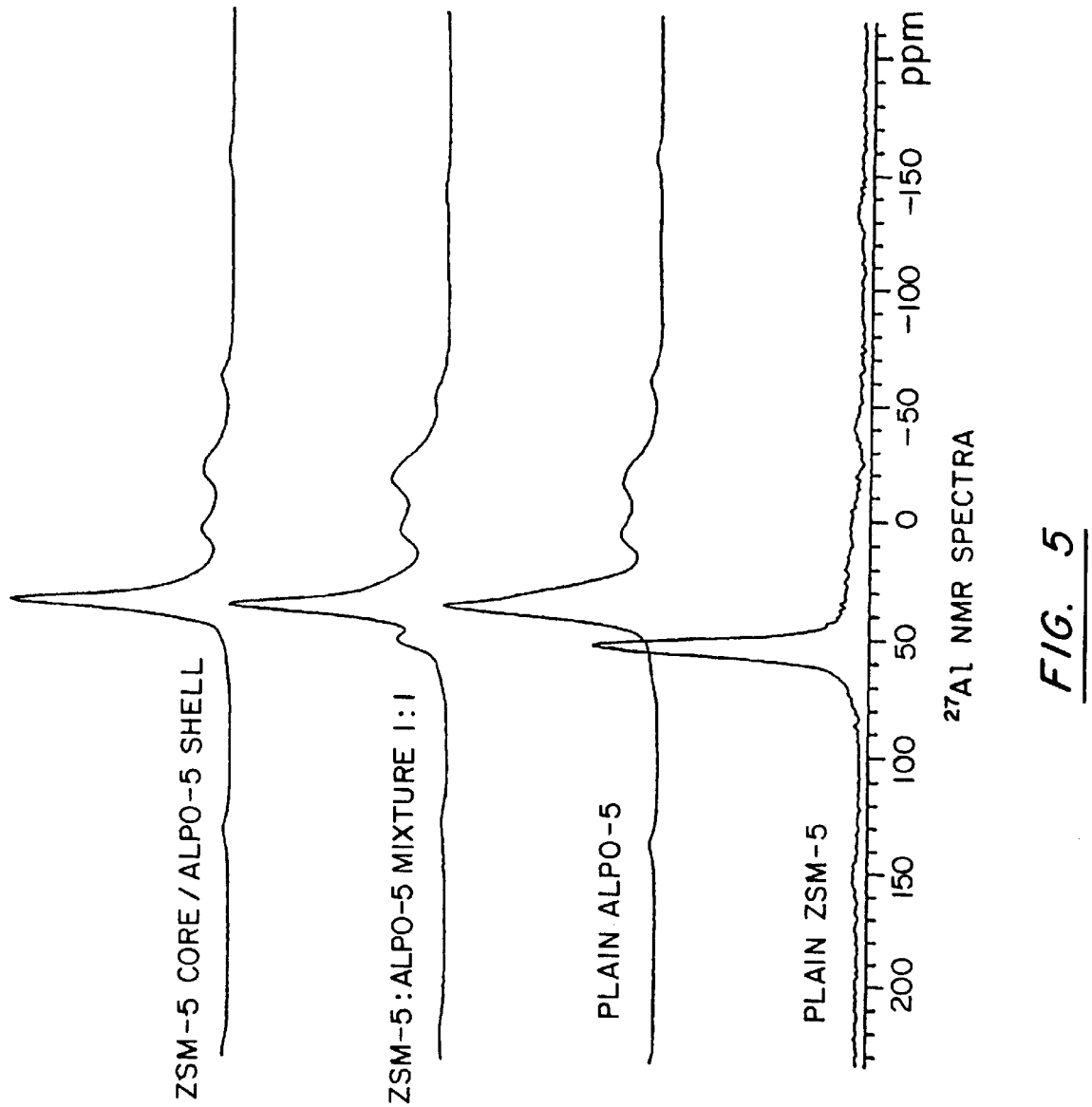
FIG. 5 shows an $^{27}Al$ NMR Spectra.

Solid state nuclear magnetic resonance (NMR) was also used to characterize the samples synthesized according to this invention. Spectra of $^{27}$Al shown in FIG. 5 reveal that the resonance of tetrahedral Al(OP)$_4$ at 38 ppm is the major peak in samples of plain ALPO-5, 1:1 physical mixture of ALPO-5 and ZSM-5, and ZSM-5 core/ALPO-5 shell. This tetrahedral aluminum linked to four phosphorus via oxygen bridging is a unique feature of aluminophosphate molecular sieves such as ALPO-5, which is obviously absent in the aluminosilicate ZSM-5 sample.

Figure 6:
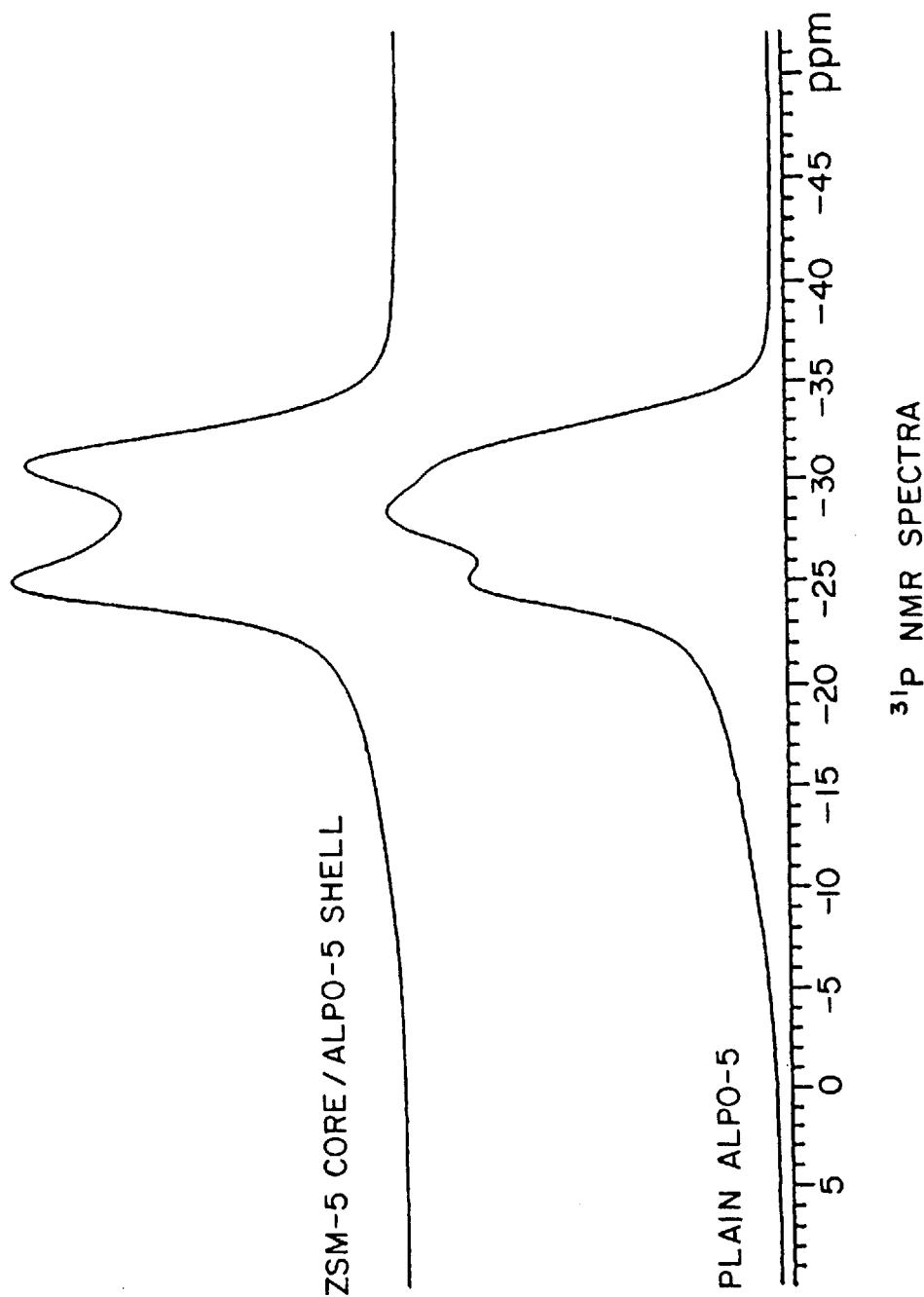
FIG. 6 shows a $^{31}P$ NMR spectra.

NMR results of $^{31}$P also manifest the presence of ALPO-5 shell around ZSM-5 in the binary system (FIG. 6). The resonances around −28 to −30 ppm are due to phosphorus coordinated to four tetrahedral aluminums, P(OAl)$_4$ which is a fingerprint of aluminophosphate molecular sieves. Resonance at −24 ppm, however, is due to phosphorus coordinated to three tetrahedral aluminum. A comparison between the $^{31}$P spectrum of ALPO-5 and that of ZSM-5 core/ALPO-5 shell, again discloses the morphology difference of the ALPO-5 phase in these two samples. A layer of ALPO-5 grown around ZSM-5 particles of irregular shape would conceivably have more defects in its structure than crystallites of pure ALPO-5 phase.

Figure 7:
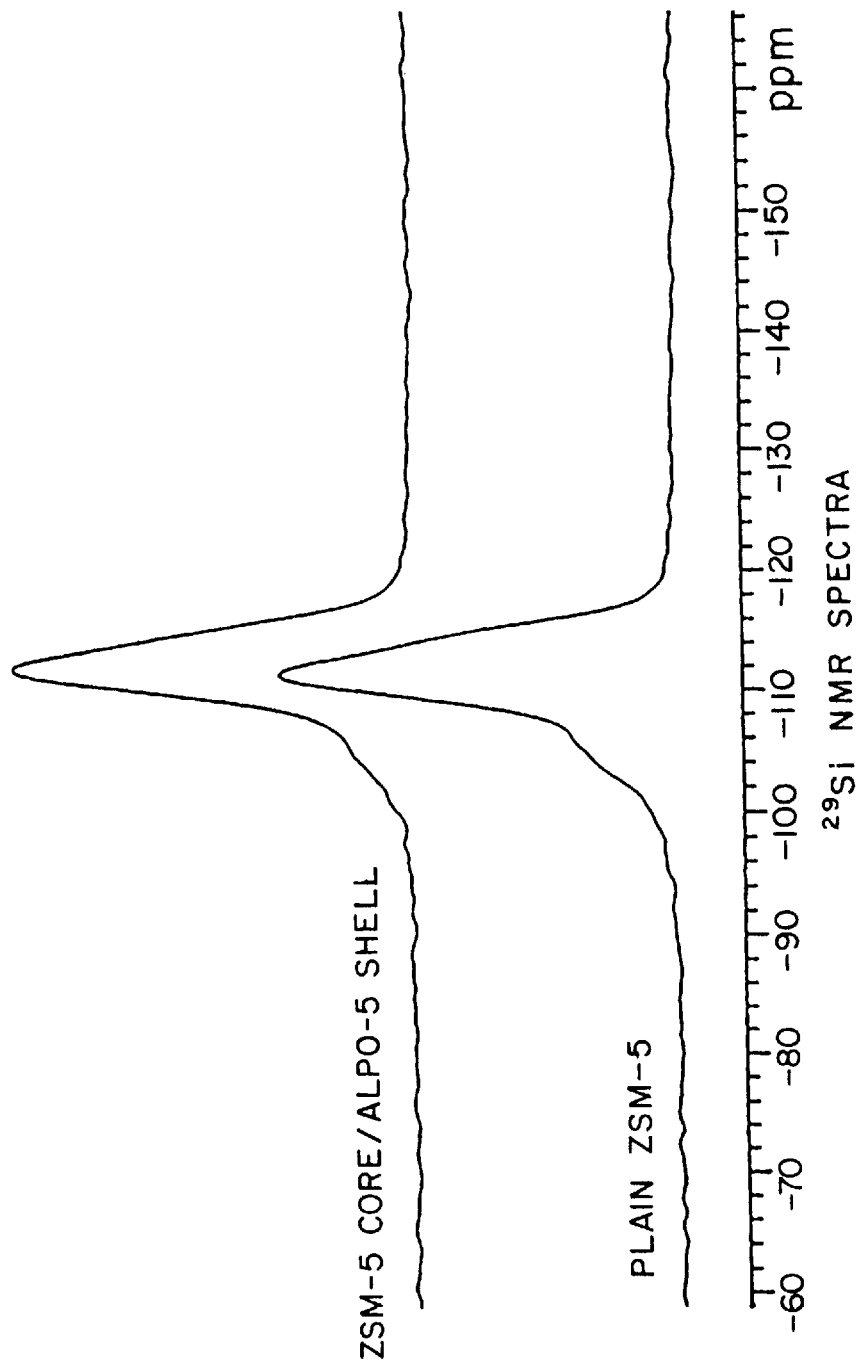
FIG. 7 shows a $^{29}Si$ NMR spectra.

Preservation of the ZSM-5 phase in the synthesis conditions of ALPO-5 is further verified (in addition to XRD) by $^{29}$Si NMR. As shown in FIG. 7, the signature of Si in aluminosilicate zeolite framework is clearly present in the plain ZSM-5 as well as in the binary molecular sieve sample.

Probe reactions manifested deviation of the catalytic properties of the sample of the core/shell configuration from a physical mixture of ZSM-5+ALPO-5 just as differences were apparent in the results of XRD, XPS and NMR characterizations studies.

The examples which follow illustrate the use of the binary molecular sieve catalyst containing a core of zeolite crystalline aluminosilicate and a shell of an aluminophosphate molecular sieve. These examples are only intended as a means of illustration and it should be understood the invention is not meant to be limited thereby.

EXAMPLE 1

In this example the samples compared in Table 1 were tested for propylene upgrading reaction under the following conditions:

Feed=50% propylene/50% propane

Catalyst Load=0.05 g

Temperature=400° C.

Pressure=1 atm.

WHSV=21.8 g propylene/g cat/hr

Figure 8:
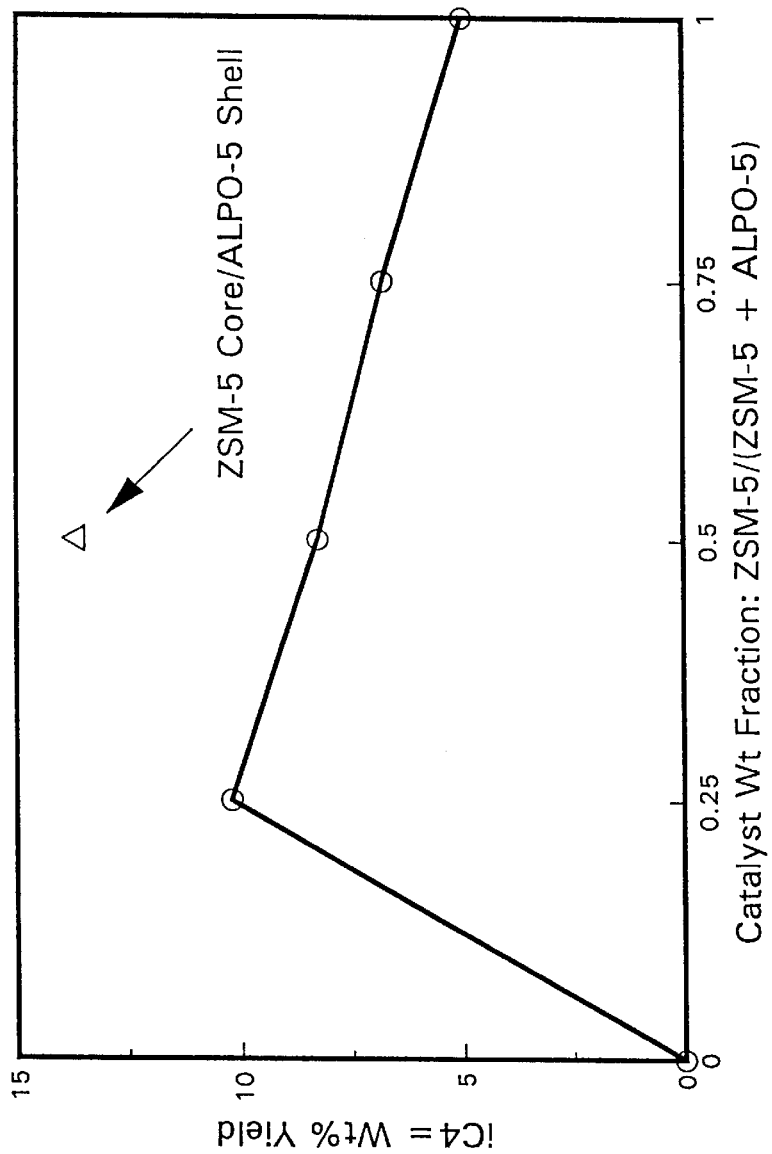
FIG. 8 shows isobutylene yield from a propylene upgrading reaction over physical mixtures of ZSM-5 and ALPO-5

Isobutylene is an essential feedstock for the production of MTBE which is often blended into reformulated gasoline. The isobutylene yields obtained from propylene upgrading (FIG. 8) clearly show the advantage and deviation of the ZSM-5 core/ALPO-5 shell sample as opposed the physical mixture samples of separate ZSM-5 and ALPO-5 particles.

EXAMPLE 2

In this example the samples of Table 1 were used as FCC additives and evaluated using a FCC-MAT unit.

The base catalyst used was an equilibrium catalyst containing RE-USY zeolite having the properties shown in Table 2. Table 3 lists the properties of the gas oil used. The conditions in the FCC-MAT unit were as follows:

Catalyst Load=total 4g

Additive Load=2 wt %

Cat/Oil=5

Temperature=960° F.

Pressure=1 atom

WHSV=32 hr$^{-1}$

It is a common practice in refinery to use ZSM-5 additives to enhance light olefins yield from the FCCU. However, ZSM-5 FCC additives also cause substantial gasoline yield loss. In this example, it is demonstrated that the additive of ZSM-5 core/ALPO-5 shell can enhance light olefins yield with reduced gasoline yield loss.

Figure 9:
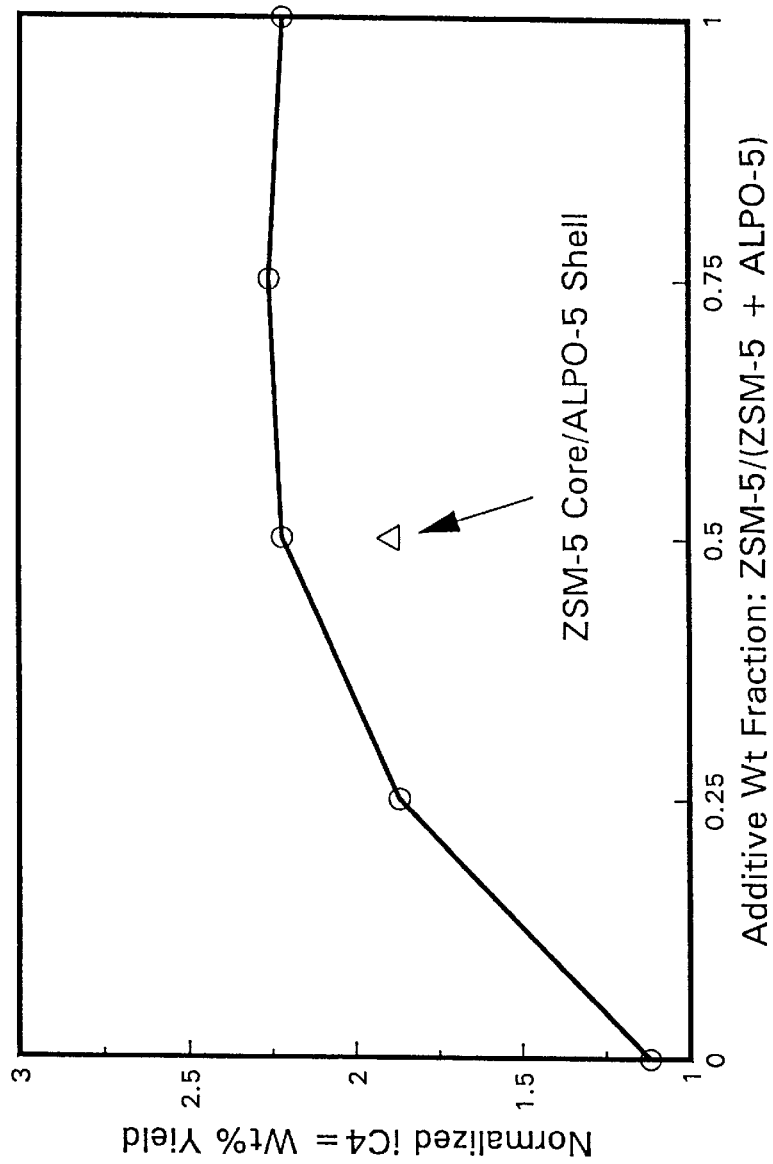
FIG. 9 shows isobutylene yield from an FCC-MAT test using physical mixtures of ZSM-5 and ALPO-5 as FCC additives.

The isobutylene and gasoline yields from the FCC-MAT tests are plotted in FIGS. 9 and 10, respectively, using physical mixtures of ZSM-5 and ALPO-5 with various compositions. The curves are drawn according to averaged results of duplicated runs. The triangles are data points obtained using the ZSM-5 core/ALPO-5 shell sample. It is apparent they are different from the 1:1 physical mixture.

The results of characterization and reaction studies disclose evidence of the successful synthesis of a catalytically active binary molecular sieve comprising a core of ZSM-5 and a shell of ALPO-5. Other combinations of various molecular sieves of similar configurations can be prepared according to this invention. In addition, multi-layers of shells can be synthesized.

TABLE 1

Catalyst Compositions from XPS and Chemical Analyses

| Catalyst | Si Molar Fraction on Surface Si/(Si + Al + P) From XPS Analysis | Si Molar Fraction in Bulk Si/(Si + Al + P) From Chemical Analysis |
|---|---|---|
| ZSM-5 | 0.93 | 0.95 |
| ALPO-5 | 0.00 | 0.00 |
| ZSM-5 Core/ALPO-5 Shell | 0.15 | 0.29 |
| ZSM-5:ALPO-5 Mix. 1:1 | 0.65 | 0.48 |
| ZSM-5:ALPO-5 Mix. 3:1 | 0.80 | 0.71 |
| ZSM-5:ALPO-5 Mix. 1:3 | 0.38 | 0.28 |

TABLE 2

Properties of the Equilibrium Catalyst Used as the Base Catalyst in FCC-MAT Testing

| Al$_2$O$_3$ | 35.4 wt % |
|---|---|
| SiO$_2$ | 59.1 |
| Na$_2$O | 0.47 wt % |
| Nickel | 270 ppm |
| Vanadium | 700 ppm |
| BET Surface Area | 153 m$^2$/g |
| Pore Volume | 0.36 cc/g |

TABLE 3

Properties of the Gas Oil Used in FCC-MAT Testing

| API Gravity | 21.4 |
|---|---|
| Pour Point | 91° F. |
| Aniline Point | 163° F. |
| Sulfur | 2.52 wt % |
| Vanadium | <1.0 ppm |
| Nickel | <1.0 ppm |
| Paraffins | 8.6 wt % |

What is claimed is:

1. A method for synthesizing a binary molecular sieve, said binary molecular sieve comprising a crystalline zeolite metallosilicate core and a shell consisting of an aluminum phosphate molecular sieve ($AlPO_4$), which comprises:

adding a powdered form of crystalline zeolite metallosilicate into an aqueous slurry comprising phosphoric acid, pseudoboehmite alumina and tripropylamine, wherein the slurry has the molar ratio of $Al_2O_5:P_2O_5$:tripropylamine of 1:1:0.5 to 1:1:5, and 20 to 60 moles of water per mole of $Al_2O_3$, mixing the slurry for 1 to 12 hours in a liner at room temperature, sealing said slurry in an autoclave and placing said slurry in an oven at 130° C. to 170° C. for 12 to 96 hours to form said binary molecular sieve catalyst, washing and drying the product, calcining the product at 530° to 570° C. in nitrogen for 5–15 hours, calcining the product in air for 1 to 3 hours to burn off the template.

2. The method of claim 1 wherein said powdered crystalline zeolite metallosilicate optionally contains a metal selected from the group consisting of Si, Al, Ga, Fe, B, Ti, La, Cr and V.

3. The method of claim 1 wherein said powdered crystalline zeolite metallosilicate is ZSM-5, optionally containing a metal selected from the group consisting of Si, Al, Ga, Fe, B, Ti, La, Cr and V.

4. The method of claim 1 wherein said shell is ALPO-5.

5. The method of claim 1 wherein said shell is an aluminophoshate ($ALPO_4$) selected from the group consisting of ALPO-11, ALPO-31, ALPO-34, ALPO-36, ALPO-37 and ALPO-46.

6. The method of claim 1 wherein the metallosilicates contain framework elements selected from the group consisting of Si, Al, P, Ga, Fe, B, Ti, La, Y, Cr, Nb, V, Mg, Be, As, Zn, Ni, Mo, W, having sieve structures selected from the group consisting of faujasite, Y, L, A, mordenite, beta, omega, offretite and ferrierite.

7. The method of claim 1 wherein the recited steps are repeated to form compositions with more than two layers.

8. A method for synthesizing a binary molecular sieve, said binary molecular sieve comprising a crystalline zeolite metallosilicate core and a shell consisting of a silicon-substituted aluminophosphate shell (SAPO), which comprises:

adding a powdered form of crystalline zeolite metallosilicate into an aqueous slurry comprising a phosphoric acid, an alumina source, an amine selected from a tetralkyl ammonium hydroxide and tripropylamine, and dipropylamine, and a source of silica, wherein the slurry has the molar ratio of $Al_2O_5:P_2O_5$:R of 1:1:0.5 to 1:1:5, and 10 to 60 moles of water per mole of $Al_2O_3$, wherein R is an organic templating agent;

mixing the slurry for 1 to 12 hours in a liner at room temperature, sealing said slurry in an autoclave and placing said slurry in an oven at 130° C. to 240° C. for 12 to 168 hours to form said binary molecular sieve catalyst, washing and drying the product, calcining the product at 530° to 570° C. in nitrogen for 5–15 hours, calcining the product in air for 1 to 3 hours to burn off the template.

9. The method of claim 1 wherein said shell is a silicon-substituted aluminophosphate (SAPO) selected from the group consisting of SAPO-11, SAPO-31, SAPO-34, SAPO-36, SAPO-37 and SAPO-46.

10. The method of claim 8 wherein the metallosilicates contain framework elements selected from the group consisting of Si, Al, P, Ga, Fe, B, Ti, La, Y, Cr, Nb, V, Mg, Be, As, Zn, Ni, Mo, W, having sieve structures selected from the group consisting of faujasite, Y, L, A, mordenite, beta, omega, offretite, and ferrierite.

11. The method of claim 8 wherein the alumina source is selected from pseudo-boehmite and aluminum isopropoxide.

12. The method of claim 8 wherein the silica source is selected from fume silica and tetraethyl silicate.

13. A method for synthesizing a binary molecular sieve, said binary molecular sieve comprising a crystalline zeolite metallosilicate core and a shell consisting of a crystalline metal aluminophosphate (MeAPO), which comprises:

adding a powdered form of crystalline zeolite metallosilicate into an aqueous slurry resulting from adding a mixture of a salt, oxide, or hydroxide of a metal to a reaction mixture of orthophosphoric acid and an alumina source to an amine templating agent, wherein the slurry has the molar ratio of $Al_2O_5:P_2O_5$:R:metal of 1:0.9:0.5:0.05 to 1:1.2:5.0:0.30, and 10 to 60 moles of water per mole of $Al_2O_3$, wherein R is an organic templating agent, mixing the slurry for 1 to 12 hours in a liner at room temperature, sealing said slurry in an autoclave and placing said slurry in an oven at 130° C. to 240° C. for 12 to 168 hours to form said binary molecular sieve catalyst, washing and drying the product, calcining the product at 530° to 570° C. in nitrogen for 5–15 hours, calcining the product in air for 1 to 3 hours to burn off the template.

14. The method of claim 13 wherein the salt of a metal is selected from the group consisting of a salt of magnesium, manganese, cobalt and zinc.

15. The method of claim 13 wherein said shell is a crystalline metallosilicoaluminophosphate molecular sieve selected from the group consisting of MnAPSO-5, CoAPSO-36, MgAPSO-46, CoAPSO-11, MnAPSO-46, and MgAPSO-31.

16. A composition comprising a crystalline zeolite metallosilicate core and a metallo aluminumphosphate molecular sieve shell selected from the group consisting of aluminophosphate molecular sieves ($AlPO_4$), silicon-substituted aluminophosphates (SAPO), metal aluminophosphates (MeAPO), and metallosilicoaluminophosphates (MeAPSO).

17. A composition comprising a crystalline zeolite metallosilicate core and an aluminophosphate molecular sieve shell selected from the group consisting of aluminophosphate molecular sieves ($AlPO_4$), silicon-substituted aluminophosphates (SAPO), metal aluminophosphates (MeAPO), and metallosilicoaluminophosphates (MeAPSO) which results from adding a powdered form of crystalline zeolite metallosilicate into an aqueous slurry comprising phosphoric acid, pseudoboehmite alumina and tripropylamine, and optionally a silica-containing compound or a salt, oxide or hydroxide of a metal selected from Mn, Co, Mg, and Zn, wherein the slurry has the molar ratio of $Al_2O_5:P_2O_5$:R of 1:1:0.5 to 1:1:5, and 10 to 60 moles of water per mole of $Al_2O_3$, wherein R is an organic templating agent, mixing the slurry for 1 to 12 hours in a liner at room temperature, sealing said slurry in an autoclave and placing said slurry in an oven at 130° C. to 240° C. for 12 to 168 hours to form said binary molecular sieve catalyst, washing and drying the product, calcining the product at 530° to 570° C. in nitrogen for 5–15 hours, calcining the product in air for 1 to 3 hours to burn off the template.

18. The composition of claim 17 wherein the powdered crystalline zeolite metallosilicate used to form said catalyst is powdered ZSM-5.

19. The composition of claim 17 wherein the shell of the catalyst is ALPO-5.

20. The composition of claim 17 which further comprises multiple layers.

21. The composition of claim 17 wherein the shell is a silicon-substituted aluminophosphate selected from the group consisting of: SAPO-11, SAPO-31, SAPO-34, SAPO-36, SAPO-37 and SAPO-46.

22. The composition of claim 17 wherein the metallosilicate core contain framework elements selected from the group consisting of Si, Al, P, Ga, Fe, B, Ti, La, Y, Cr, Nb, V, Mg, Be, As, Zn, Ni, Mo, W, having sieved structures selected from the group consisting of faujasite, Y, L, A, mordenite, beta, omega, offretite, ferrierite.

23. The composition of claim 17 further comprising multiple layers resulting from repeating the steps.

24. The composition of claim 17 wherein the shell is a crystalline metal aluminophosphate, selected from the group consisting of: MnAPSO-5, CoAPSO-36, MgAPSO-46, CoAPSO-11, MnAPSO-46, MgAPO-31 and MgAPSO-31.

* * * * *